OPTO-ELECTRONIC LOGIC ELEMENT

Filed May 6, 1964

2 Sheets-Sheet 1

Aug. 12, 1969 E. H. COOKE-YARBOROUGH ET AL 3,461,297

OPTO-ELECTRONIC LOGIC ELEMENT

Filed May 6, 1964 2 Sheets-Sheet 2

United States Patent Office 3,461,297
Patented Aug. 12, 1969

3,461,297

OPTO-ELECTRONIC LOGIC ELEMENT

Edmund Harry Cooke-Yarborough, Longworth, near Abingdon, and Peter Edwin Gibbons, Grove, near Wantage, England, assignors to United Kingdom Atomic Energy Authority, London, England Filed May 6, 1964, Ser. No. 365,315
Claims priority, application Great Britain, May 10, 1963, 18,555/63; Jan. 23, 1964, 3,056/64
Int. Cl. H01j 39/12, 31/50
U.S. Cl. 250—213 8 Claims

ABSTRACT OF THE DISCLOSURE

A high-speed opto-electronic logic element comprising an electron detector and an electroluminescent light source sharing a common voltage source, and a photocathode which emits electrons under the action of input light pulses. These electrons strike the electron detector, lowering its impedance and so extinguishing the light source.

This invention relates to opto-electronic signal-translating devices.

Most known digital computers use logic elements made up of conventional electronic components interconnected by wiring, but the speed of operation of such elements, and therefore the speed of operation of computers using such elements, is limited.

One object of the present invention is to provide an opto-electronic signal-translating device, which may be used in a logic element. When so used, the device permits a speed of operation as high or higher than that obtainable with known forms of logic element made up of conventional electronic components interconnected by wiring.

According to the present invention, an opto-electronic signal-translating device comprises an electron emitter which gives off electrons under the action of incident light, an electron detector which passes a current when it is struck by electrons, and an electroluminescent light source arranged to share a common voltage source with the electron detector so that an increase in the current flowing in the electron detector decreases the light output of the light source, the arrangement being such that when the electron emitter gives off electrons, electrons are caused to strike the electron detector and hence the light output of the light source is reduced.

The term "light" as used herein is not necessarily restricted to visible light. The light source may, for example be a gallium arsenide diode, in which case the "light" emitted is in the infra red region of the spectrum.

An opto-electronic signal-translating device in accordance with the present invention will now be described by way of example with reference to the accompanying drawings in which.

Figure 1:
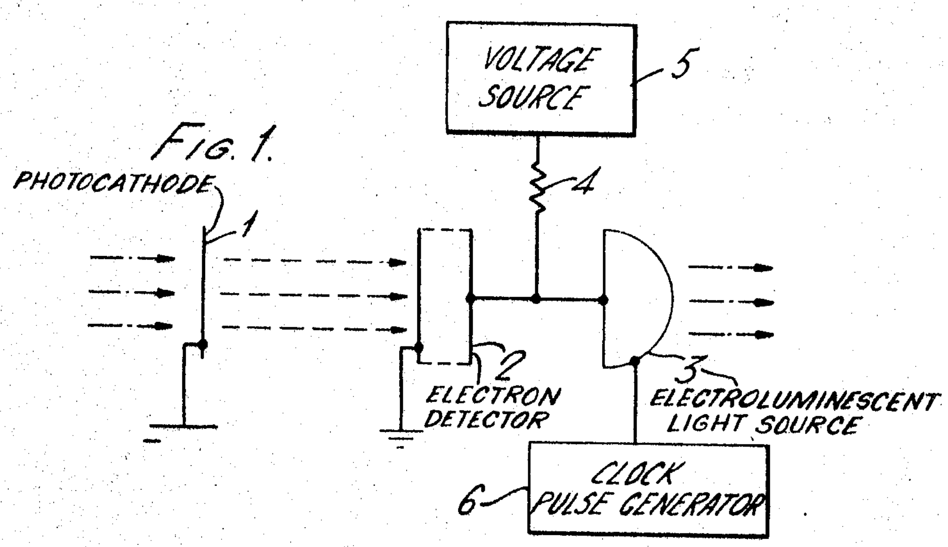
FIGURE 1 shows diagrammatically a logic element using such a device.

Referring now to FIGURE 1 of the drawings, the device comprises a photocathode 1, a semiconductor junction electron detector 2, and an eletcroluminescent light source formed by a gallium arsenide diode 3. The detector 2 and the diode 3 are connected in parallel with one another and by way of a common resistor 4 to a voltage source 5.

When light falls on the photocathode 1 electrons are emitted and these electrons, possibly after multiplication, are arranged to strike the detector 2 with sufficient energy to generate electron-hole pairs in the depletion layer, so causing a current to flow in the detector 2. As the detector 2 is in parallel with the diode 3, this reduces the current flowing in the diode 3 and hence reduces the light output.

The use of such a device in a logic element for a binary digital computer will now be considered. One of the most useful logic elements is the "nor" gate, as logical elements for performing other logical operations can be built up from such gates. A "nor" gate consists essentially of an "or" gate followed by an invertor. Thus the output is "0" if there is a "1" at any input, and the output is "1" if there is "0" at all the inputs. It is to be noted that a "nor" gate is not only required to give logical gain and inversion but must also provide non-linearity as the "0" output must be independent of the number of "1s'" applied to the input.

In the present case a "1" is represented by the presence of light and a "0" by the absence of light. Paths for the transmission of light between logic elements are formed by optical fibres and it can be shown that the energy level at which information can be carried by light pulses in such a fibre is several orders smaller than in the case of signals in an electrical line.

The "nor" gate is formed by a device as described above and a (voltage) clock pulse generator 6 which will normally be common to a large number of gates. The gate has the appropriate number of inputs, each formed by an optical fibre, and a number of outputs, also formed by optical fibres, the number of outputs depending upon the desired logical gain.

Figure 2:
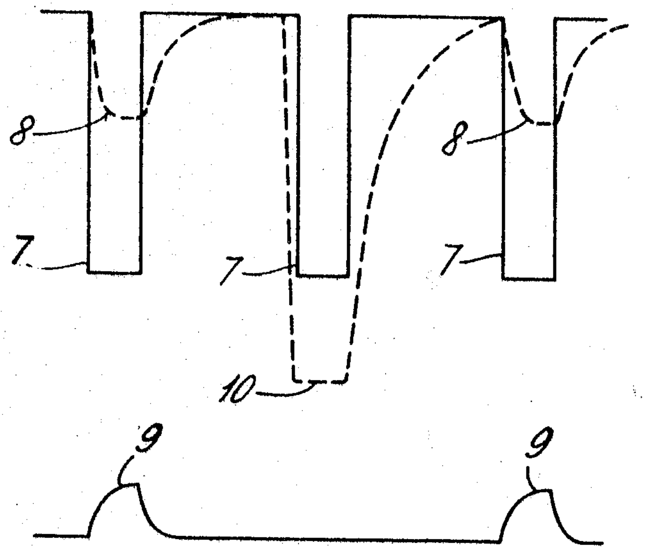
FIGURE 2 shows waveforms used in explaining the operation of the logic element of FIGURE 1.

The arrangement is such that in the absence of input light pulses and clock pulses, there are no output light pulses from the diode 3. This may be seen by referring also to FIGURE 2 of the drawings in which the pulses 7 are due to the clock pulse generator 6, the broken line 8 represents the voltage at the emitter of the diode 3 and the lower line 9 represents the light output of the diode 3.

The clock pulses 7 are applied at regularly recurrent instants to one terminal of the diode 3, and the effect of each clock pulse 7 is momentarily to increase the voltage across the diode 3, this being the sum of the voltage 8 due to the current source 5 and that due to the clock pulse 7, to such a magnitude that the diode 3 conducts and emits a pulse of light 9. A pulse of light 9 is therefore supplied over each of the output paths on the occurrence of each clock pulse 7. If, however, a pulse of light has been supplied over any one of the input paths at the appropriate time, the detector 2 will be passing a current at the instant a clock pulse is supplied to the diode 3, in which case the voltage 10 due to the current source 5 is less and the voltage across the diode 3 is arranged to be insufficient to cause the diode 3 to conduct, and no pulse of light is therefore emitted. Thus the required "nor" gate operation is obtained.

Any logic element introduces a finite delay, in that the response at the output to a change at the input is not instantaneous. Another factor which may influence the speed of a logical system is the minimum repetition period of the logic elements in the system, that is, the interval which must elapse between the application of one logical input signal and the application of the next.

The minimum repetition period of the "nor" gate described above is very short, but is to some extent dependent on the recovery time of the detector 2. Similarly, the time delay of the gate is very short, but is to some extent dependent upon the logical gain required. Where electron multiplication is used a part of the time delay occurs in the electron multiplier and depends on the type of multiplier used. With a channel type of multiplier using an insulating tube coated on the inside with semiconducting, secondary emitting material, a current gain of 10 is obtainable in about a nanosecond.

The detector 2 provides a large current gain, as one electron-hole pair is generated in the detector 2 for approximately every three electron volts energy of the incident electrons. Practical solid-state electron detectors have a "dead-zone" at the front face in which electron-hole pairs generated are not collected. To obtain efficient operation the incident electrons must have a fairly large energy, to ensure that most of this energy is absorbed in generating electron-hole pairs beyond the "dead zone." With currently available diffused junction detectors this calls for an electron energy of the order of 20 kilo-electron volts, giving a current gain of approximately 6000.

The diode 3 operates by injection luminescence. Thus injected minority carriers recombine directly with majority carriers, emitting recombination radiation at a wavelength of approximately 0.85 micron, that is, in the infra red region of the spectrum. The recombination time is about a nanosecond and if the diode 3 is cooled to liquid nitrogen temperature the efficiency of converting electrons to photons is approximately 40%.

The diode 3 is therefore quite efficient, but a high gain is still necessary because of the losses which occur elsewhere. Thus assuming a required logical gain of four, and reasonable extraction of the light from the diode 3, a conservative estimate of the quantum efficiency between electrons passing through the diode 3 and photons reaching the photocathode 1 of any one of the following logic elements is 1%.

The quantum efficiency of a photocathode sensitive to wavelengths of about 0.85 micron is only about 0.3%, and the photocathode 1 may have to be cooled to liquid nitrogen temperature for use at these wavelengths. Using these figures it can be shown that the quantum efficiency between electrons passing through the diode 3 and photons reaching the photocathode 1 of each the following logic elements is about $(4\times10^{-2})/F$, where F is the logical gain. In view of the low level of electron emission from the photocathodes 1, this must be multiplied by a further factor (say 2/3) to allow for statistical variations in electron emission from the photocathodes 1.

Figure 3:
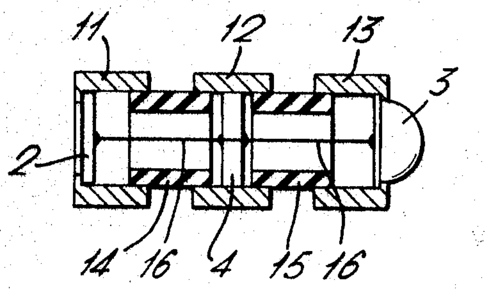
FIGURE 3 shows a section through a practical configuration of the logic element of FIGURE 1.

Several practical configurations are possible. For example, each detector 2 and associated diode 3 and resistor 4 may be assembled as a unit. Referring to FIGURE 3 of the drawings, three hollow hexagonal copper contacts 11, 12 and 13 are provided (each shaped like a nut without internal threads), the three contacts 11, 12 and 13 being spaced apart in the axial direction by two insulating tubes 14 and 15. The detector 2 and the diode 3 are mounted in the contacts 11 and 13 respectively and the resistor 4, which is in the form of a disc of resistive material, in the contact 12. Wires 16 connect the centre of the disc to the appropriate terminals of the detector 2 and the diode 3, the other terminal of each of these components being connected to the associated contact 11 or 13. The input face of the detector 2 is at the outer end of the contact 11 and the output face of the diode 3 is at the outer end of the contact 13. In view of the very high refractive index of gallium arsenide, better extraction of light can be achieved by making the output face hemispherical.

Figure 4:
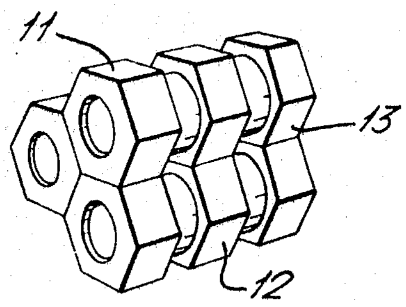
FIGURE 4 shows how groups of logic elements each having the configuration of FIGURE 3 can be assembled together.

A group of such units can conveniently be clamped together with corresponding contacts 11, 12 and 13 touching, to form an array as shown in FIGURE 4 of the drawings. The source 5 is connected to the contacts 12, the clock pulse generator 6 is connected to the contacts 13, and the contacts 11 are earthed.

Connections between logic elements are formed by optical fibres which may be in random bundles. One end of each bundle is put in contact with one end of each group of logic elements. Then, prior to interconnecting the other ends of the fibres, each bundle is investigated to establish which fibres communicate with which logic elements.

A bundle of optical fibres may be used to carry the digits of a word in parallel. This is routed around the computer as a complete bundle. If desired, part at least of the route could use conventional optical systems using mirrors and lenses.

As an alternative to the unit described above, three separate planar arrays may be made, for example by an integrated circuit technique, one comprising detectors 2, another resistors 4, and the third diodes 3. These separate arrays are brought together and individual connections made by pressure contacts.

Although in the foregoing description it has been assumed that where electron multiplication is used each logic element has a separate electron multiplier, this is not essential. In fact, from the point of view of cost it is undesirable. Thus an image intensifier of known form can act as the electron multiplier for a large numbers of logic elements, the actual number being determined by the spatial resolution of the image intensifier, the power dissipation, and registration problems. The phosphor screen of the image intensifier is replaced by an array of electron detectors.

Increase in the efficiency can lead to a decrease in the time delay with, if desired, an increase in the logical gain. In particular if an efficient electroluminescent diode emitting light in the visible region of the spectrum is used, the resulting increase in the efficiency of the photocathode 1 could clearly remove any need for electron multiplication, the electrons emitted from the photocathode 1 merely being suitably accelerated so as to strike the detector 2 with the required energies. A diode formed from a crystal of 25% gallium phosphide and 75% gallium arsenide giving light at about 0.74 micron could be used.

"Nor" gates as described above may be interconnected to form small storage registers, in fact a single "nor" gate fed back on itself through an optical path of suitable length may be used as a phase-bistable storage element, its input being light and dark in alternate clock periods. Its state is changed by illuminating the photocathode 1 during the dark period. Alternatively, two logic elements may be cross-connected to form a bistable system, in which case clock pulsing would not be needed.

We claim:

1. Opto-electronic logic means, comprising
   - light-responsive electron emitter means for emitting electrons under the action of incident light;
   - accelerating means for accelerating the emitted electrons; electron detector means for generating a current when struck by the accelerated electrons;
   - an electroluminescent light source;
   - a voltage source;
   - circuit means connecting said electron detector means and said light source in parallel with said voltage source, whereby when the electron emitter gives off electrons, accelerated electrons are caused to strike the electron detector to increase the current flowing therein and to decrease the light output of the light source, and a clock pulse generator arranged to supply voltage pulses to the light source to cause the light source to supply a pulse of light only under the action of those clock pulses which are supplied at times when the electron detector is not generating a current.

2. A device in accordance with claim 1 wherein said electron detector is a semiconductor junction electron detector.

3. A device in accordance with claim 1 wherein said light source is a gallium arsenide diode.

4. A device in accordance with claim 1 wherein said light source is a gallium arsenide/gallium phosphide diode.

5. A device in accordance with claim 1 wherein said electron emitter is a photocathode.

6. A device in accordance with claim 1, wherein said accelerating means produces an electron energy of on the order of 20 kilo-electron volts.

7. Apparatus as defined in claim 1, and further including multiplying means for multiplying the electrons emitted by said electron emitter means.

8. Opto-electronic logic means, comprising light-responsive electron emitter means for emitting electrons under the action of incident light;

means for supplying input light pulses to said electron emitter means to cause emission of electrons therefrom;

accelerating means for accelerating the emitted electrons to an electron energy of approximately 20 kilo-electron volts;

electron detection means for passing a current in response to impingement by said accelerated electrons;

an electroluminescent light source;

a voltage source;

means connecting said light source and said electron detection means in parallel with said voltage source so that an increase in the current flowing in the electron detector means decreases the light output of the light source;

means defining an output path for receiving the light pulses from the light source;

and a clock pulse generator arranged to supply voltage pulses to the light source to cause the light source to supply a pulse of light only under the action of those clock pulses which are supplied at times when the electron detector is not passing a current.

References Cited

UNITED STATES PATENTS

| | | | |
|---|---|---|---|
| 2,833,936 | 5/1958 | Ress | 307—88.5 |
| 2,678,400 | 5/1954 | McKay | 250—207 |
| 2,886,739 | 5/1959 | Matthews et al | 250—211 |
| 3,086,119 | 4/1963 | Fomenko | 250—213 |
| 3,185,850 | 5/1965 | Terlet | 250—209 |
| 3,268,733 | 8/1966 | Deelman et al. | 250—217 |

ARCHIE R. BORCHELT, Primary Examiner

T. N. GRIGSBY, Assistant Examiner

U.S. Cl. X.R.

250—206, 207, 209, 211, 217; 307—311, 312